Feb. 21, 1956 W. R. BAKER ET AL 2,735,963

SUPPRESSOR CIRCUIT

Filed Dec. 10, 1947

INVENTORS
WILLIAM R. BAKER
QUENTIN A. KERNS

BY

Robert A. Lavender

ATTORNEY

United States Patent Office 2,735,963
Patented Feb. 21, 1956

2,735,963

SUPPRESSOR CIRCUIT

William R. Baker and Quentin A. Kerns, Berkeley, Calif., assignors to the United States of America as represented by the United States Atomic Energy Commission Application December 10, 1947, Serial No. 790,910

5 Claims. (Cl. 317—31)

This invention relates broadly to spark suppressors. More specifically the invention pertains to electronic switching apparatus adapted to cut off a power supply upon sudden voltage fluctuations in the load circuit of the power supply, and further to maintain this "cutoff" condition for a period of time as set by the operator. This invention is particularly adaptable to the control of calutron source voltage so as to eliminate sparking, however, no such limitation is intended as many uses will become immediately apparent upon a study of the following description of the invention.

A primary object of the invention is to provide an electronic switching apparatus capable of preventing excess sparking between two oppositely charged electrodes.

Another object of this invention is to provide an electronic switching apparatus capable of protecting a power supply from undue sparking between a calutron ion source transmitter and calutron liner.

A further object is to provide an electronic switching apparatus sensitive only to rapid voltage fluctuations.

A still further object is to provide an electronic switching apparatus capable of disconnecting a high voltage power supply for any desired period of time upon a sudden reduction of load voltage.

Figure 1:
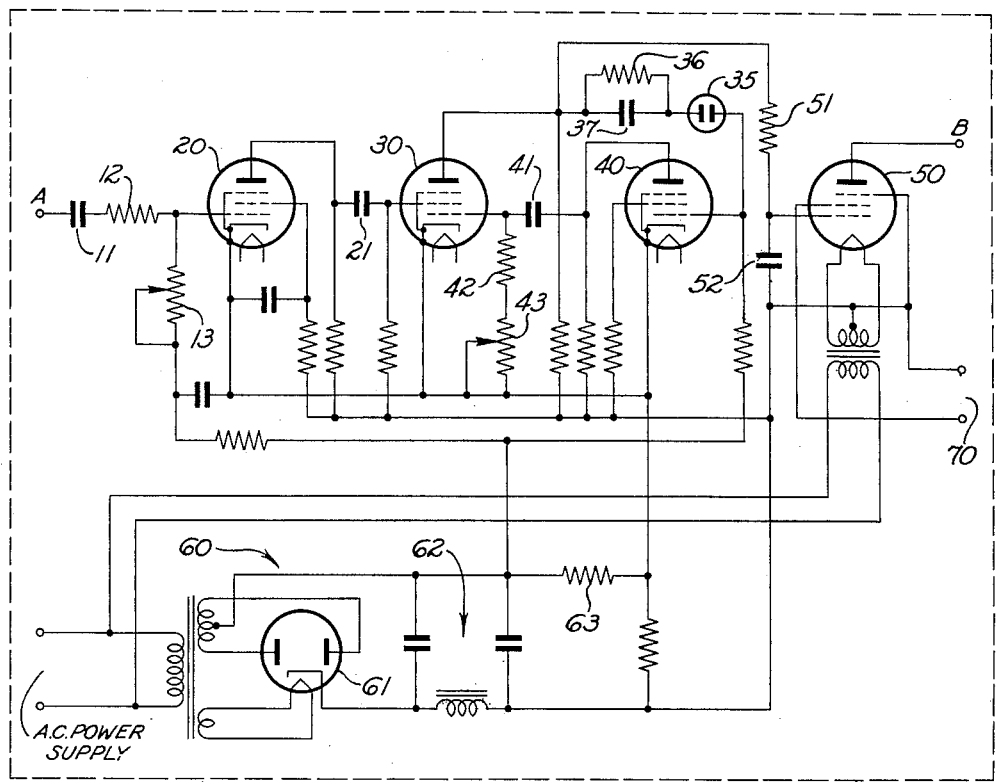

In order to facilitate an explanation of the instant invention, two drawings are included herein: Figure 1 being a circuit diagram of the suppressor proper, and Fig. 2 being a diagram of one preferred application of the invention.

During the operation of a calutron it has been found a common occurrence for sparks, or arc discharges, to short out the high voltage power supply. This condition is detrimental to operation, and there is a possibility of serious damage to power supplies and other associated equipment. Consider for example a high voltage power supply connected in series with a current limiting device and a spark gap. Upon impression of the high potential across the gap no voltage exists across the limiter until an arc occurs across the gap. At this time the current rises until a sufficient portion of the high potential appears across the limiter to extinguish the arc. The current then ceases to flow and the voltage again builds up across the gap. This time the gap breaks down much quicker as the gas is still partially ionized from the previous arc discharge. Actual tests show that this is what happens in a calutron, the voltage rising and dropping in rapid succession. Thus in order to provide proper protection against arcing, the suppressor must not only instantaneously disconnect the power supply but also maintain this condition for a period of time.

Figure 2:
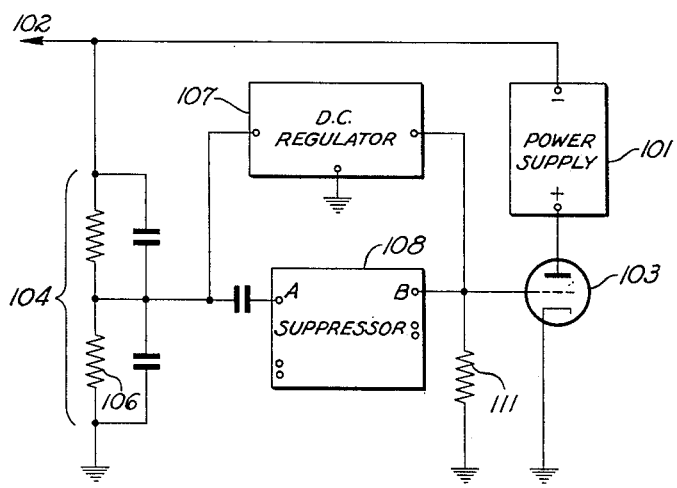

It is therefore necessary to apply a steep negative wavefront on the grid of the regulating tube in the electrical setup shown in Fig. 2, thereby driving the tube to cutoff, and to maintain this condition for a definite interval of time.

Reference to Fig. 2 shows a high voltage power supply 101, the negative terminal being connected to the accelerating electrode 102 of a calutron transmitter, whose ion source is grounded, and the positive terminal being connected through a regulating triode vacuum tube 103 to ground. A fraction of the voltage applied to the accelerating electrode is taken off the beta network 104 which is capacity compensated to permit the division of steep wavefronts without distortion. This voltage fraction is compared to the standard voltage in the D. C. voltage regulator 107 and the difference amplified and applied to the control grid of the regulating vacuum tube 103, thus completing the regulating loop of the high voltage supply. The suppressor 108 is connected across the D. C. regulator 107 and any sudden drop across resistor 106 of beta network 104, as a result of sparking, transmits a voltage pulse to the suppressor, which in turn applies a negative signal of predetermined duration to the grid of the regulator tube 103. The regulator tube is cut off by this negative signal and thereby disconnects the power supply 101 from the calutron transmitter for the duration of the signal.

With regard to the invention proper, Fig. 1 depicts the elements and connections thereof. The two Figs. 1 and 2 may be readily oriented with respect to one another by noting that points A and B are identical on each. Viewing the unit from A, the first element encountered is a condenser 11, which functions as a D. C. blocking condenser. It is followed by a resistance 12, which when considered in connection with the grid capacity of the first tube 20, serves to increase the time duration of the applied pulse, thus insuring operation even on the fastest pulses. The sensitivity or "threshold" is controlled by means of a variable resistor 13, which forms a part of a voltage divider, the other parts being the reactance of the blocking condenser 11 and resistance 12.

Following the voltage divider is a tetrode vacuum tube 20 serving as an inverter. Two tetrodes 30 and 40 are connected as a "locked" multivibrator and are capacity coupled to the inverter 20 by condenser 21. The multivibrator output is taken from the plate of the first tube 30 in the form of a negative square wave. This signal is applied to the grid of a power amplifier 50 through the plate resistor 51 of tube 30 which is in series with the grid circuit of the pentode power amplifier tube 50. Resistance 51 and condenser 52 introduce a correct time constant in the grid circuit of tube 50 so that transient troubles in the power amplifier 50 are avoided.

A power supply 60, including a double diode vacuum tube 61 and filter 62, is utilized to provide operating voltages to tubes 20, 30 and 40, the voltage drop across resistance 63 providing the cutoff bias for tubes 20 and 40. A further high voltage power supply 70 is utilized to provide the operating potentials for the power amplifier tube 50.

Considering the operation of this invention it may be noted that a rapid potential drop at the calutron ion source transmitter due to sparking immediately results in a potential difference appearing across resistance 106 of the beta network 104. A positive signal having a steep wavefront then appears at point A and enters the suppressor 108. A portion of this positive signal, as determined by the setting of resistance 13, is then applied to the control grid of the inverter 20. The resultant positive grid potential causes tube 20 to fire thus reducing the plate potential materially. The plate of tube 20 subsequently becomes relatively negative and this potential is applied through a condenser 21 to the screen grid of tube 30, thus driving the tube 30 to cutoff. The plate of tube 30 is coupled to the control grid of the other multivibrator tube 40 through a glow discharge tube such as a neon tube 35, and a network consisting of a resistance 36 and capacitance 37. It is to be appreciated that although a gaseous discharge tube is preferable in this case for coupling the vacuum tubes, other types of discharge devices could be utilized for this purpose. When the plate of tube 30 goes positive rapidly, as it does when a signal is applied, the steep wave is transferred to the glow discharge tube 35 through the condenser 37. The neon lamp 35 breaks down as a result of the increased potential across it, thus driving the grid of tube 40 positive as in the usual multivibrator. Grid current is limited by resistance 36 which also provides D. C. coupling. Vacuum tube 40 fires, the potential drop across tube 40 then decreases, and the relatively negative plate voltage of tube 40 is impressed upon the control grid of tube 30 through a condenser 41. This negative potential cuts off the tube 30 which remains cut off until the negative charge is dissipated through resistances 42 and 43. Thus the cutoff period of tube 30 may be controlled by varying the value of resistance 43.

Tube 30 is normally conducting and the voltage drop across its plate resistor 51 represents the bias applied to the power amplifier. As this bias is in a negative direction there is normally no plate current flowing in the power amplifier tube 50 and no voltage drop across its plate resistor 111 which is also the grid resistor of the regulating tube 103. However when tube 30 passes a negative square wave signal the grid bias of the power amplifier 50 increases so that the tube 50 fires for the duration of the signal. Current flows through the plate resistance 111 when tube 50 conducts. As resistance 111 is also the grid resistor of the regulating tube 103 a negative grid bias is applied to the grid of the regulating tube 103 thereby driving the tube to cutoff and effectively disconnecting the high voltage power supply 101. This condition extends for the duration of time that the negative square wave signal is applied to the power amplifier 50 thus providing a positive quick acting disconnect having an easily controlled time constant.

The above operation occurs each time that a rapid potential variation occurs at the calutron ion source transmitter and the high voltage supply is subsequently disconnected for a predetermined period of time following the potential variation.

While I have described the salient features of this invention with respect to a particular and preferred embodiment thereof, it will be further understood that various modifications may be made, and it is intended that the appended claims shall cover all such modifications as fall within the true spirit and scope of the invention.

What is claimed is:

1. In combination with a high voltage power supply grounded through a regulating tube; an electronic switch; means connected to said power supply and sensing fluctuations of the output thereof; connections impressing a fraction of any rapid voltage fluctuation of the output of said high voltage power supply upon the input of said electronic switch, said switch including a phase inverter having the input thereof connected to the input of the switch, a locked multivibrator having two vacuum tubes coupled with a discharge device, connections impressing the output of said phase inverter upon the input of said multivibrator, and connections impressing the negative square wave output of said multivibrator upon said regulating tube and thereby disconnecting said high voltage power supply for the duration of said neagtive square wave signal.

2. An electronic switch as presented by claim 1 further characterized by means to control the duration of said multivibrator square wave output and thus control the period over which said high voltage power supply is disconnected.

3. In a regulated high voltage power supply circuit having a regulating tube having a control electrode and grounding the positive terminal of said power supply, a resistance to ground network connected to the negative terminal of said high voltage power supply, and a regulating circuit connected to a point on said resistance network and to the control electrode of said regulating tube; a suppressor circuit connected across said regulator circuit including a phase inverter having the input coupled to the juncture of said regulator and resistance network, two vacuum tubes connected to form a locked multivibrator, means coupling the output of said phase inverter to the input of said multivibrator, a gaseous discharge device coupling said two vacuum tubes whereby the output of said multivibrator assumes the form of a negative square wave, means to vary the duration of said negative square wave output, and connections impressing the output of said multivibrator upon the control electrode of said regulating tube.

4. A regulator for a direct current high voltage power supply including a regulator tube having a control electrode and grounding one terminal of said power supply, a suppressor circuit including two electron vacuum tubes connected as a locked multivibrator, a gaseous discharge device coupling said two multivibrator tubes whereby the output of said suppressor circuit assumes the form of a negative square wave signal, means to impress a portion of any rapid fluctuation in the output of said high voltage power supply voltage upon said suppressor circuit, and further means impressing the output of said suppressor circuit upon the control electrode of said regulating tube thereby disconnecting said high voltage power supply at the time of any rapid voltage fluctuations of said high voltage power supply.

5. An electric circuit as set forth in claim 4 further characterized by a resistance-capacitance network including a variable resistor and coupling the second of said multivibrator vacuum tubes to the first multiplier tube whereby the duration of said negative square wave multivibrator output signal may be varied.

References Cited in the file of this patent

UNITED STATES PATENTS

| | | |
|---|---|---|
| 2,050,882 | Fitzgerald | Aug. 11, 1936 |
| 2,071,860 | Stoddard | Feb. 23, 1937 |
| 2,403,984 | Koenig, Jr., et al. | July 16, 1946 |
| 2,441,006 | Canfora | May 4, 1948 |